Aug. 12, 1930.  E. BREITWIESER  1,772,534
SLIDING HOLDER FOR BROILER PANS
Filed June 26, 1928  2 Sheets-Sheet 1

Inventor
Edward Breitwieser
By Popp & Powers
Attorneys

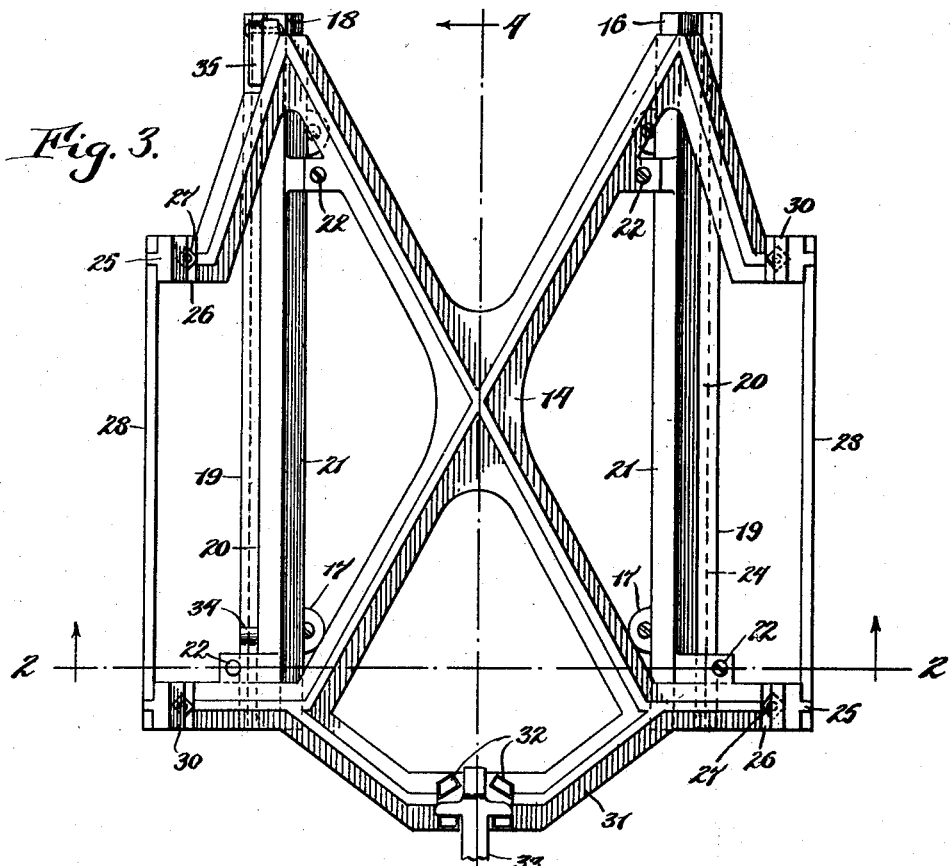
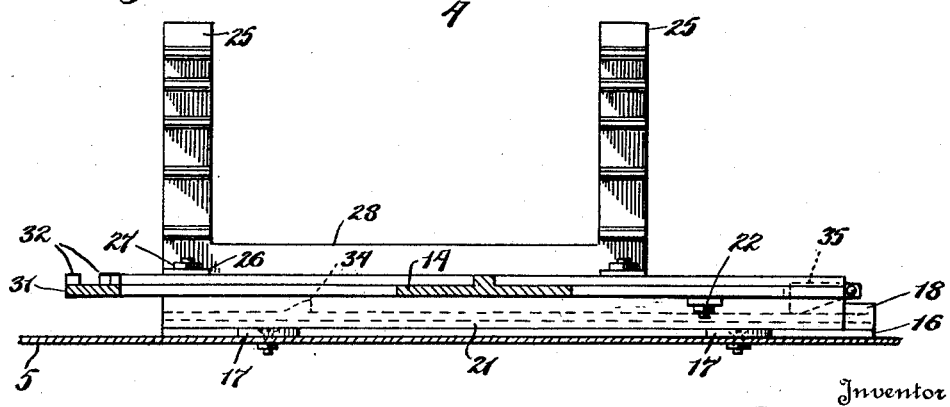

Patented Aug. 12, 1930

1,772,534

UNITED STATES PATENT OFFICE

EDWARD BREITWIESER, OF BUFFALO, NEW YORK, ASSIGNOR TO BUFFALO CO-OPERATIVE STOVE CO., OF BUFFALO, NEW YORK, A CORPORATION OF NEW YORK

SLIDING HOLDER FOR BROILER PANS

Application filed June 26, 1928. Serial No. 288,354.

This invention relates to a sliding broiler pan holder and more particularly to a device for sliding by supporting a broiler pan in a cook oven so that the broiler pan can be readily moved out of the oven or into the same when it is desired to remove or prepare the food cooking in the same.

The principal object of this invention is to provide such a broiler pan holder which can be easily slid in and out of the oven and in which the broiler pan can be readily placed and removed, the supported broiler pan in the outward position of the holder being arranged wholly exterior of the oven.

Another aim is to provide such a holder which is light in weight and of durable construction and will not become warped under the conditions of oven heat but will operate to give continuous satisfactory service.

Another aim is to provide a holder of this character which is supported wholly by rails secured to the oven floor in all positions thereof and at no time bears against the oven door.

A still further object is to provide a holder in which the broiler pan can be placed at different heights so as to permit of placing the pan at different distances from the usual overhead flame for different meats being broiled.

Another object is to provide means whereby the usual lid lifter can be used to move the broiler pan holder in and out of the oven, this being particularly important when the holder is hot.

Another purpose is to provide means for limiting the outward movement of the holder, which means can be readily released when it is desired to remove the holder from the oven.

Other aims are to provide an inexpensive sliding broiler pan holder of this character which is readily assembled and can be easily placed in stoves of standard design, and which takes up the minimum amount of room in the oven.

In the accompanying drawings:

Figure 3 is a top plan view of the broiler pan holder and the supporting rails therefor.

Figure 4 is a fragmentary section through the oven floor and holder, the same being taken on line 4—4, Fig. 3.

Similar reference numerals refer to similar parts in each of the several views.

Figure 1:
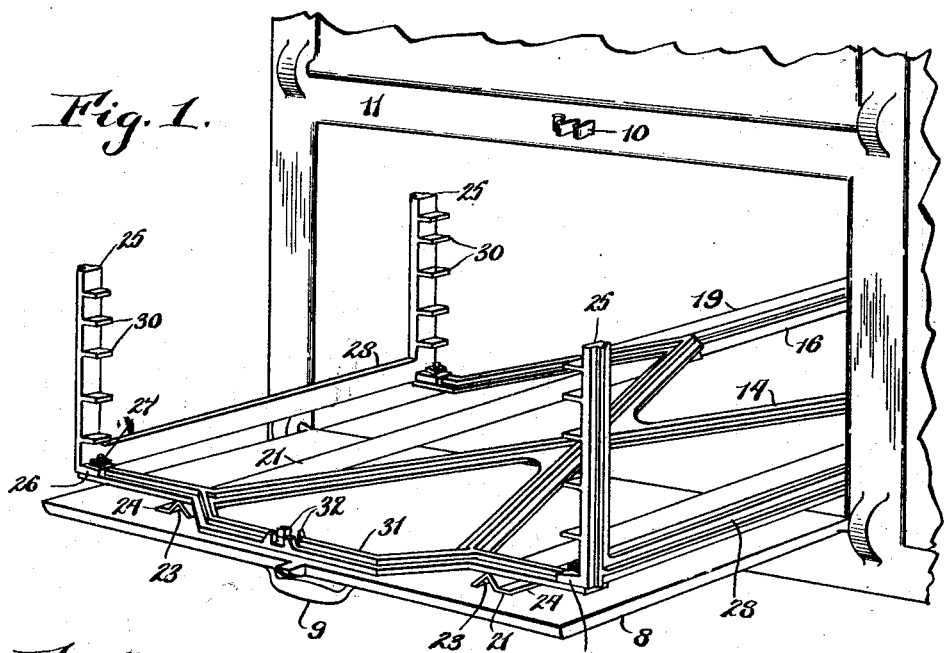
Figure 1 is a fragmentary perspective view of a stove showing the broiler oven door open and the sliding broiler pan holder slid part way out of the oven.

The broiler pan holder is shown in connection with a broiler oven having the usual floor 5, side walls 6, top 7, and front door 8 which is hinged at its lower end for downwardly swinging movement and when open forms a continuation of the oven floor 5. The door is limited in its downward movement in any suitable manner and is opened and closed by means of the usual handle 9 and is held closed by a catch 10 on the stove frame 11. In the upper part of the oven are arranged the usual gas burner pipes 12 which have a series of ports 13, these ports directing the ignited gas downwardly and laterally so as to broil the meats placed in the oven.

The sliding broiler pan holder forming the subject matter of the present invention in its general organization comprises a pair of rails secured to the oven floor, a skeleton horizontal member, shoes mounted on this skeleton member and engaging the rails, posts rising from the sides of the skeleton member and each having a series of lugs or ledges which are adapted to support the broiler pan in different positions relative to the flame, releasable means for limiting the outward movement of the skeleton member and suitable projections on the skeleton member adapted to be engaged by the head of a lid lifter for sliding the holder in and out of the broiler oven.

Each of the rails supporting the skeleton members 14 is made of two pieces which are suitably secured together by screws 15 or in any other suitable manner. One of the rail sections 16 of each rail is provided with ears 17 by means of which it is secured to the oven floor 5 and this rail is formed to provide a V-shaped ridge or corrugation 18. The other rail section 19 of each rail is secured to the under side of the rail section 16 and is formed to provide an inturned flange 20 at its outer edge.

The skeleton horizontal member may be of any suitable construction to provide a light and strong support for the broiling pan and to the under sides of this skeleton member are secured a pair of shoes 21 by means of bolts 22 or in any other manner. Each of these shoes is formed to provide a V-shaped longitudinal groove 23 which receives the V-shaped longitudinal ridge 18 on the respective rail. Each shoe is also formed to provide an outwardly extending flange 24 which engages under the flange 20 of the respective rail.

It is apparent from the above that a rail and shoe construction is provided which permits the skeleton member 14 to be easily withdrawn from the oven and that on all positions the skeleton member is supported by the rails, since in the outward position of the skeleton member, the engagement of the flanges 20 and 24 prevents the downward movement of each shoe and the shoes cannot, therefore, rest on the inner surface of the oven door.

Figure 2:
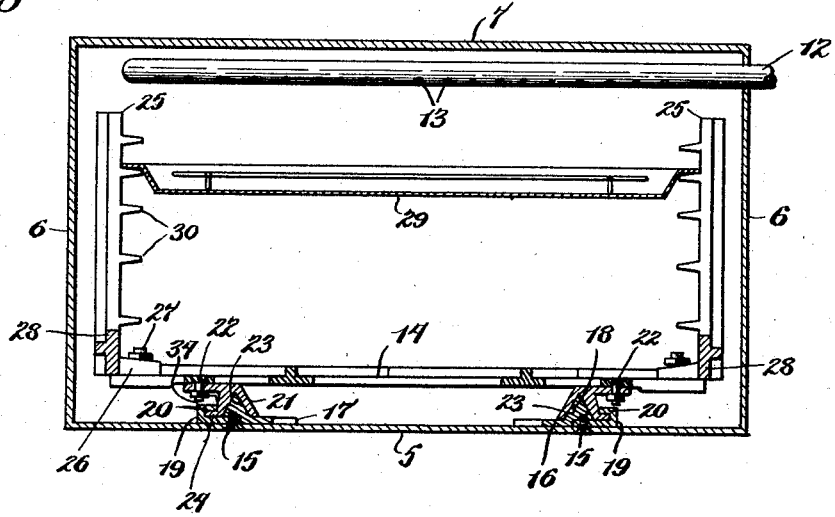
Figure 2 is a cross section of the oven and sliding broiler pan holder, the same being taken on line 2—2, Fig. 3.

On each side of the skeleton member 14, a pair of posts 25 are provided which posts are provided with ears 26 through which fastening bolts 27 extend. These posts rise from the skeleton member adjacent the oven walls 6 and each pair is connected at the lower ends by an integral bar 28. To support the broiler pan 29 on these posts, each post is provided with a series of inwardly projecting ledges or lugs 30 which engage the under side of the edges of the broiler pan 29 and support it in a horizontal position, as best shown in Fig. 2. The ledges 30 of each post are preferably so arranged that the distances between them progressively decrease as they approach the gas burners 13. By this means when the pan 29 is supported near the top of the posts 25 and the flames of the burners, a finer adjustment of its position relative to the flame, by the selection of the ledges 30 used, is possible than when the pan is supported near the bottom of the posts for slow broiling of the meat therein.

To permit of sliding the broiler pan holder in and out of the oven without danger of burning the person so doing, the skeleton member 14 is formed at its front side to provide a cross bar 31, and on the upper side of this cross bar four spaced projections 32 are provided. These projections 32 are in rectangular arrangement and are adapted to receive among them the T-shaped head of a stove lid lifter 33. By this means the head of the stove lifter 33 is placed among the projections 32 as shown in Fig. 3 and the holder shifted either outwardly or inwardly.

To prevent the person using the broiler pan holder from pulling the same out beyond its supporting rails, a stop lug 34 is cast on one of the rail sections 19 and a latch 35 is pivotally mounted on the skeleton member 14. In withdrawing the holder, the latch 35 rides along the rail section 19 until it strikes the stop lug 34, which stops further movement of the holder. If it is desired to remove the holder for cleaning it, the latch 35 is lifted so as to pass over the stop lug 34 and thereby permit the holder to be completely withdrawn from the broiler oven.

It will be noted that the shoes 21 extend rearwardly from the rear posts 25 and that therefore, in the extreme outward position of the holder, the posts 25 and the broiler pan supported thereby are arranged entirely outside of the broiler oven and the broiler pan thereby can be readily removed therefrom.

As a whole this invention provides a compact, simple and easily operated sliding holder for broiler pans, it is not likely to get out of order and is inexpensive in construction and to install.

I claim as my invention:

1. A device of the character described for slidingly supporting a receptacle for movement in and out of an oven, comprising a pair of rails secured to the oven floor, each of said rails being formed to provide a longitudinal ridge and an inturned longitudinal flange, a shoe engaging each of said rails, each shoe being formed to provide a groove receiving the ridge of the corresponding rail and a flange projecting under the inturned flange thereof, and receptacle supporting means carried by said shoes, said shoes projecting rearwardly from said receptacle supporting means whereby said receptacle supporting means can be completely withdrawn from the oven.

2. A device of the character described for slidingly supporting a receptacle for movement in and out of an oven, comprising a pair of rails secured to the oven floor and each having a longitudinal ridge, a retaining rail secured to said oven floor adjacent each of said first named rails and each retaining rail being provided with a horizontal flange, a pair of shoes engaging said rails each of said shoes being formed to provide a groove receiving the ridge of the corresponding rail and a flange projecting under the flange of the corresponding retaining rail, and supporting means carried by said shoes, said shoes projecting rearwardly from said receptacle supporting means whereby said receptacle supporting means can be completely withdrawn from the oven.

3. A device of the character described for slidingly supporting a receptacle for movement in and out of an oven, comprising a pair of rails secured to the oven floor and each having a longitudinal ridge and a longitudinal flange, a skeleton horizontal member, shoes secured to said skeleton member and each having a groove adapted to receive said ridge and a flange adapted to engage the underside of the flange of the rail, a pair of posts rising from the sides of said skeleton member adjacent the oven walls, and inwardly projecting ledges provided on said posts and adapted to support the edges of the receptacle, said shoes projecting rearwardly from said rear posts whereby the receptacle supported by said posts can be completely withdrawn from the oven.

In testimony whereof I hereby affix my signature.

EDWARD BREITWIESER.